United States Patent [19]

Sagawa

[11] Patent Number: 5,222,064
[45] Date of Patent: Jun. 22, 1993

[54] BRIDGE APPARATUS

[75] Inventor: Toyoaki Sagawa, Hyogo, Japan

[73] Assignee: Mitsubishi Denki Kabushiki Kaisha, Tokyo, Japan

[21] Appl. No.: 647,126

[22] Filed: Jan. 29, 1991

[30] Foreign Application Priority Data

May 15, 1990 [JP] Japan .................................. 2-124620

[51] Int. Cl.⁵ ................................................ H04J 3/02
[52] U.S. Cl. .............................. 370/85.13; 370/85.14; 370/85.9
[58] Field of Search ................. 370/85.13, 85.9, 85.14, 370/94.1, 94.2, 94.3

[56] References Cited

U.S. PATENT DOCUMENTS

| 4,922,503 | 5/1990 | Leone | 370/85.13 |
| 4,933,937 | 6/1990 | Konishi | 370/85.13 |
| 4,933,938 | 6/1990 | Sheehy | 370/85.13 |
| 4,996,524 | 2/1991 | Tojima | 370/85.13 |

Primary Examiner—Curtis Kuntz
Assistant Examiner—Vijay Shankar
Attorney, Agent, or Firm—Rothwell, Figg, Ernst & Kurz

[57] ABSTRACT

A bridge apparatus which judges whether a destination address of a frame relayed to a trunk line LAN is registered in other bridge apparatus or not using a control apparatus provided therein, relays the frame with a proper destination address in accordance with the result of the judgment, and allows the relaying to be carried out securely even if an address of a destination terminal has not been registered in the bridge apparatus.

5 Claims, 8 Drawing Sheets

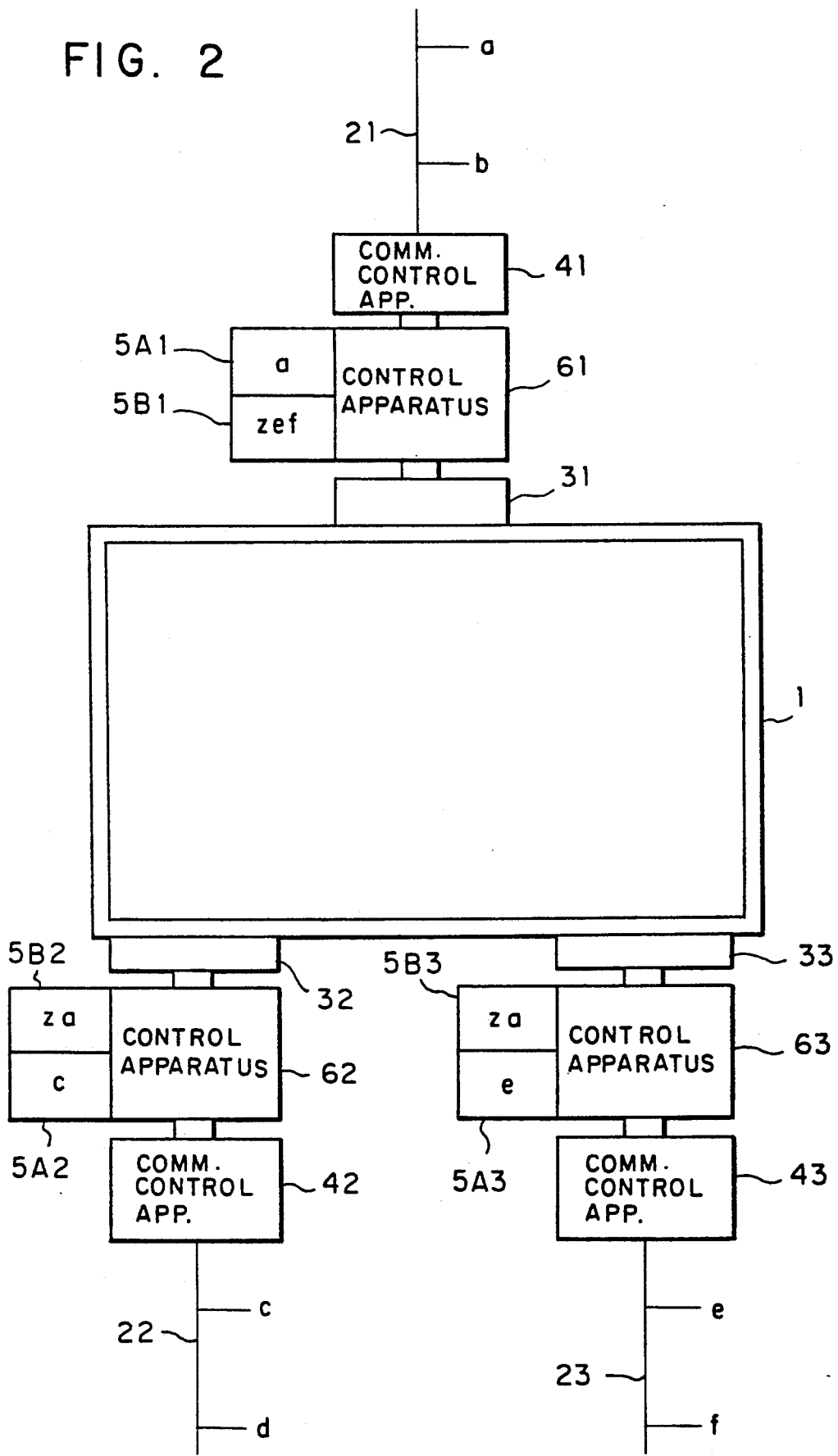

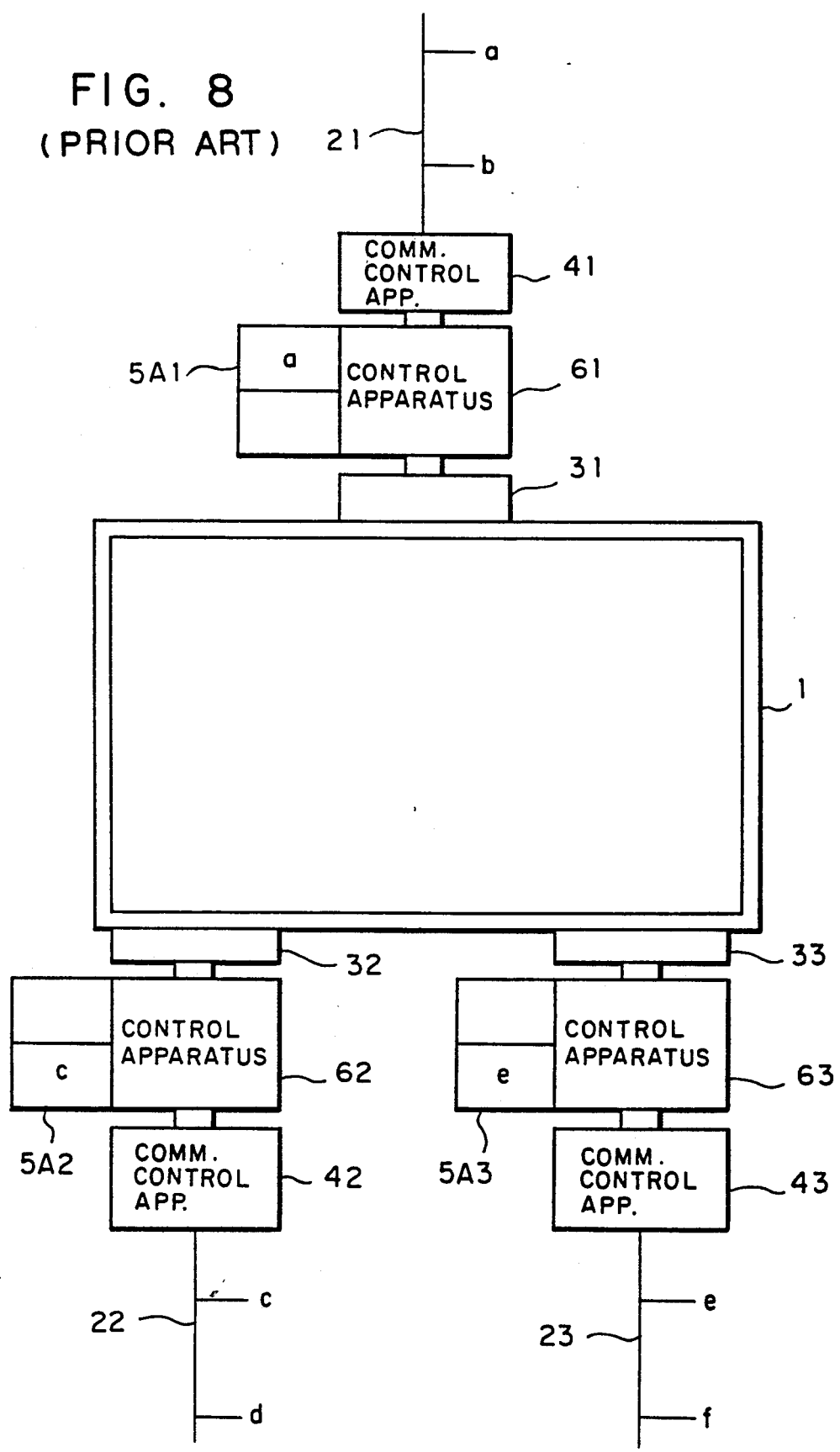

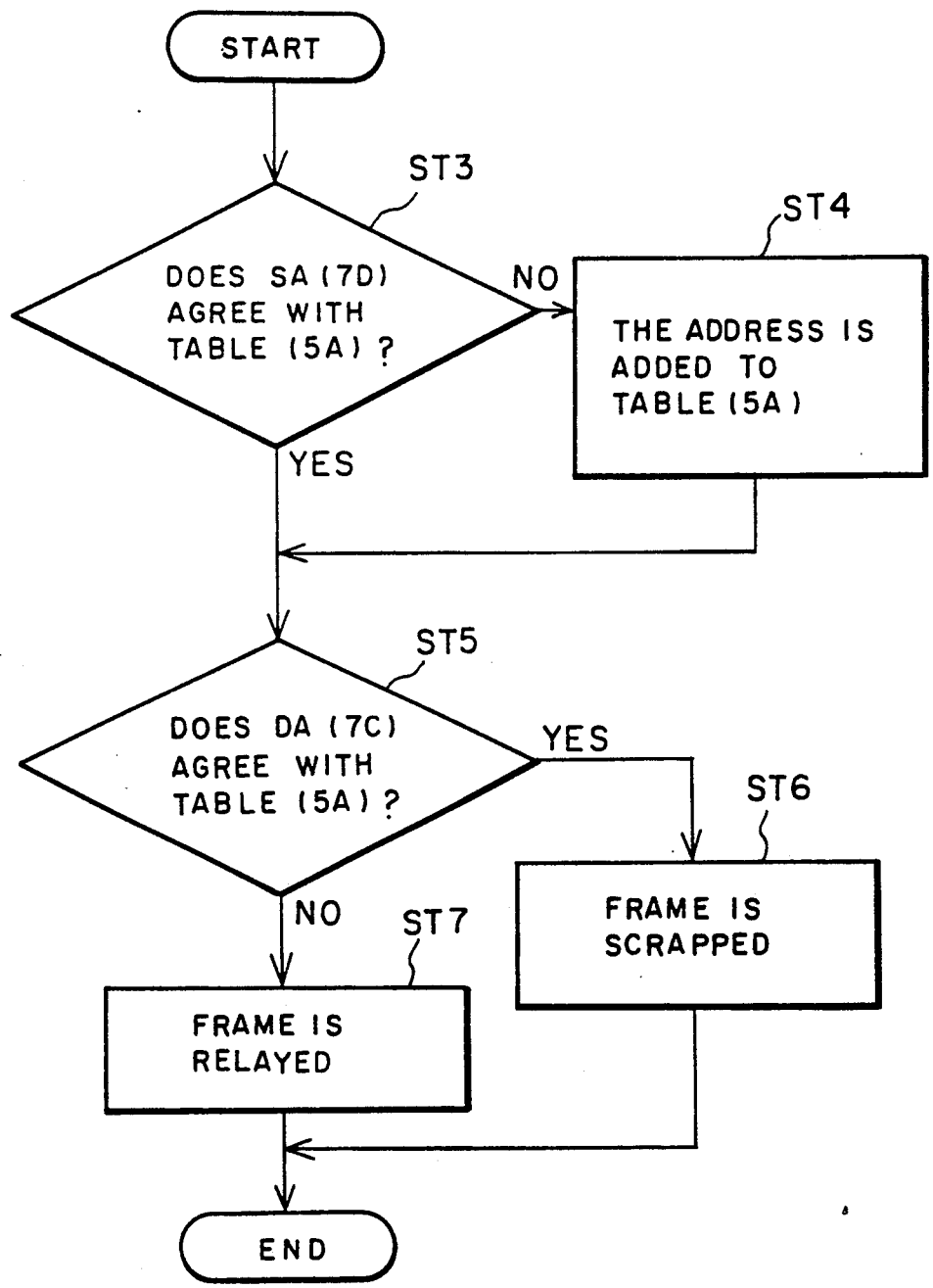

BRIDGE APPARATUS

BACKGROUND OF THE INVENTION

1. Field of the Invention

This invention relates to a bridge apparatus in which, in a local area network (LAN), a plurality of branch lines LANs are connected by a trunk line LAN.

2. Description of the Prior Art

Generally, in the case where similar branch line LANs for performing packet switching are connected to a trunk line LAN for performing packet switching, thereby carrying out communication, it is necessary to select frames on the trunk line LAN and input the frames into the branch lines, and select frames on the branch lines and transmit the frames on the trunk line. For this, a mechanism such as an address filter for determining the necessity of relaying dependent on a destination address of the frame is attached to a bridge apparatus. This address filter has a data base called an address table, and judges the necessity of relaying the frame depending on whether the destination address of the frame is found on the address table.

FIG. 7 is a block diagram showing a conventional bridge apparatus. In FIG. 7, reference numeral 3 is a communication control apparatus of a trunk line LAN, 4 a communication control apparatus of a branch line LAN, 5 an address table which stores addresses of terminals existing on the branch line as a branch address table 5A, 6 a control apparatus for the communication apparatus, which includes a microcomputer 6A and a memory 6B.

Also, FIG. 8 is a constitutional concept diagram of a network which is constituted using the bridge apparatus. In FIG. 8, reference numeral 1 is a trunk line LAN, reference numerals 21 to 23 are branch line LANs, a to f are terminals connected to the respective branch line LANs 21 to 23, 31 to 33 are communication control apparatus in the trunk line LAN 1, 41 to 43 are communication control apparatus of the branch line LANs 21 to 23, 5A1 to 5A3 are address tables for the respective branch line LANs 21 to 23, and 61 to 63 are control apparatus for these apparatus.

FIG. 9 shows an example of a frame of data used in the LAN. Reference numeral 7C is an address of a destination terminal, and the destination address (DESTINATION ADDRESS) is usually abbreviated and called DA. Reference numeral 7D is an address of a source terminal, and the source address (SOURCE ADDRESS) is usually abbreviated and called SA. Reference numeral 7E are data which a frame carries.

Next, the operation of the bridge apparatus will be described with reference to the flowcharts of FIG. 10 and FIG. 11.

At first, in FIG. 10, the frame receiving operation from the trunk line LAN 1 to the control apparatus (61 to 63 in FIG. 8) will be described.

At first, it is judged whether the destination address of the frame belongs to the terminals a to f which exist in the branch line network. (Step ST1). When the destination address agrees with the branch line address 5A (In FIG. 8, any one of the branch address tables 5A1 to 5A3), the frame is relayed to the branch line side by a relay operation (Step ST2), and the frame is received by a predetermined one of the terminals a to f on the branch lines LAN 21 to 23, respectively.

FIG. 11 represents the receiving operation of frames from the branch line LANs 21 to 23 to the control apparatus. According to the receiving operation, when the operation is begun by reception of the frames, it is checked whether the source address SA7D of the frame, agrees with the address table 5A (Step ST3). If the addresses do not agree with each other, the source address is added to the address table 5A anew. (Step ST4). On the other hand, when both agree with each other, it is checked whether the destination address DA7C of the frame exists in the address table 5A (Step ST5). If the destination address exists, it indicates that the frame is one between terminals in the same branch line, and the frame is "scrapped" or discarded from the memory of the control apparatus (Step ST6). If the destination address does not exist, it is judged that the frame is for a terminal on an external branch line, and the frame is relayed to the trunk line LAN 1 (Step ST7).

Since the conventional bridge apparatus is constituted as described above, the database of address table 5A is formed by source addresses of frames received from the branch line LANs 21 to 23. Accordingly, since the address of a terminal which has not originated transmission of a frame is not registered in the address table 5A, a frame from the trunk line intended for such terminal LAN 1 can not be received. In other words, in FIG. 8, though addresses of the terminals a, c, and e are registered, even if, for instance, the terminal e sends a frame to the terminal b, the frame is not relayed to the branch line LAN 21 because the address of the terminal b is not registered in the address table 5A. Accordingly, the terminal b can not receive the frame.

In this way, the conventional bridge apparatus does originate some calls and has the problem that the terminals a to f of which addresses have not been registered can not receive frames from other branch lines LAN 21 to 23.

SUMMARY OF THE INVENTION

This invention solves the above-mentioned problem, and it is an object of this invention to obtain a bridge apparatus capable of also communicating with terminals which are not originating calls from other branch lines LANs.

The bridge apparatus related to this invention comprises communication control apparatus in branch line local area networks connected via the branch line local networks to a trunk line local area network which has connection with a communication control apparatus in the trunk line local are network, branch line address tables for storing terminal addresses on the branch line local area networks, external address tables for storing terminal addresses which have been already registered, and control apparatus which judge agreement among addresses in these respective address tables and execute relay control of frames based on the result of the judgment and learning of contents of the respective address tables.

BRIEF DESCRIPTION OF THE DRAWINGS

FIG. 2 is a constitutional concept diagram showing a network which employs the bridge apparatus;

FIG. 8 is a constitutional concept diagram showing a network which employs the bridge apparatus;

FIG. 11 is a flowchart showing the receiving operation for a frame from a branch line LAN of the conventional apparatus.

PREFERRED EMBODIMENT OF THE INVENTION

Figure 1:
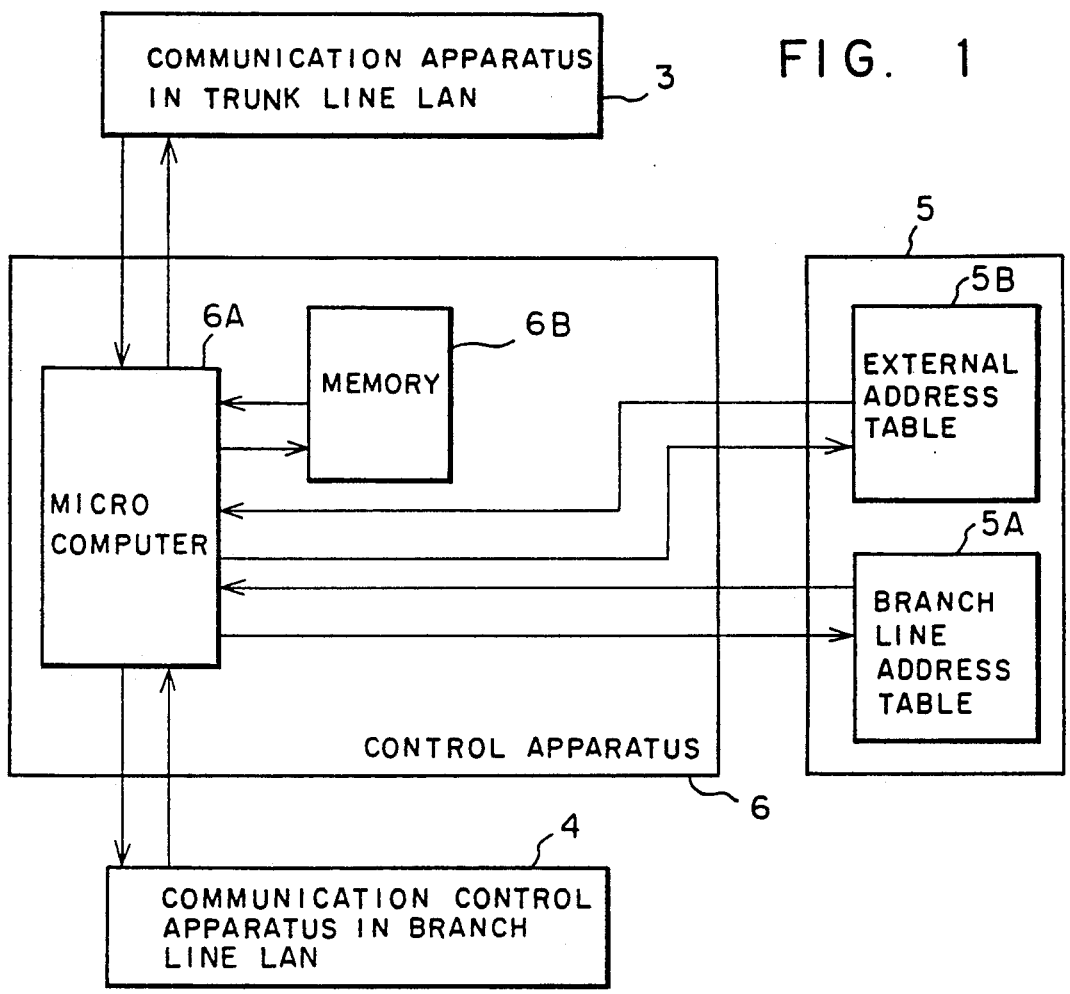
FIG. 1 is a block diagram showing a bridge apparatus in an embodiment according to this invention.

An embodiment according to this invention will be described with reference to drawings below. In FIG. 1, reference numeral 3 is a communication control apparatus of a trunk line LAN, 4 a communication control apparatus of a branch line LAN, 5 an address table provided with a branch line address table 5A and an external address table 5B, and 6 a control apparatus which has a microcomputer 6A and a memory 6B therein.

Also, FIG. 2 is a constitutional concept diagram of a network constituted using the above-mentioned bridge apparatus, and reference numerals 5B1 to 5B3 each are an external address table added for each of branch line LANs 21 to 23.

Figure 3:
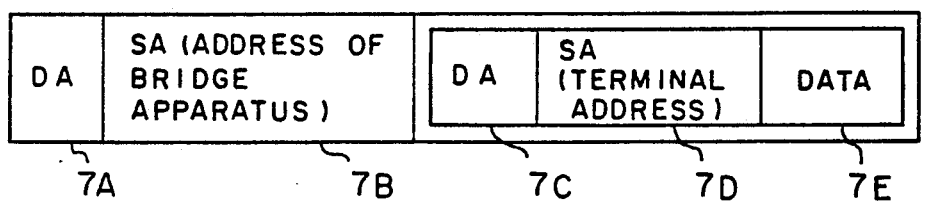
FIG. 3 is a format diagram of a frame which the bridge apparatus employs on a trunk line LAN.

FIG. 3 shows a data frame on the trunk line LAN 1. On the trunk line LAN 1, communications are carried out in the form under which the whole entire frames of the branch line LANs are stored in a data region of the trunk line data frame. Reference numeral 7A is a destination address on the trunk line LAN 1, and 7B is a source address on the trunk line LAN 1.

Figure 4:
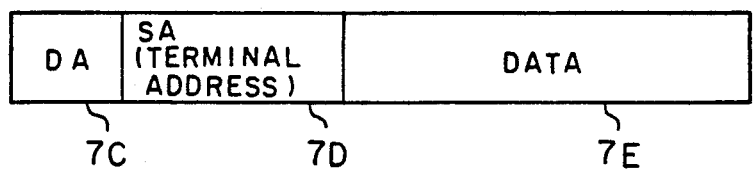
FIG. 4 is a format diagram of a frame which the bridge apparatus employs on a branch line LAN.
Figure 9:
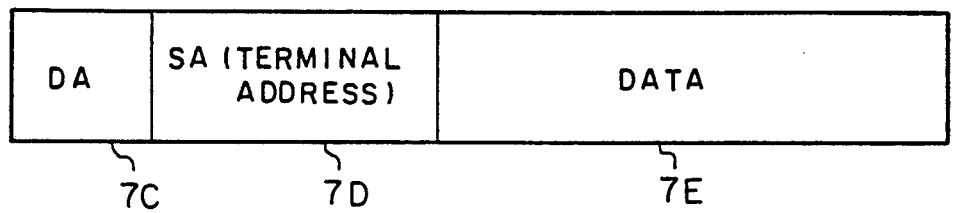
FIG. 9 is a format diagram showing a frame which the conventional bridge apparatus employs.
Figure 10:
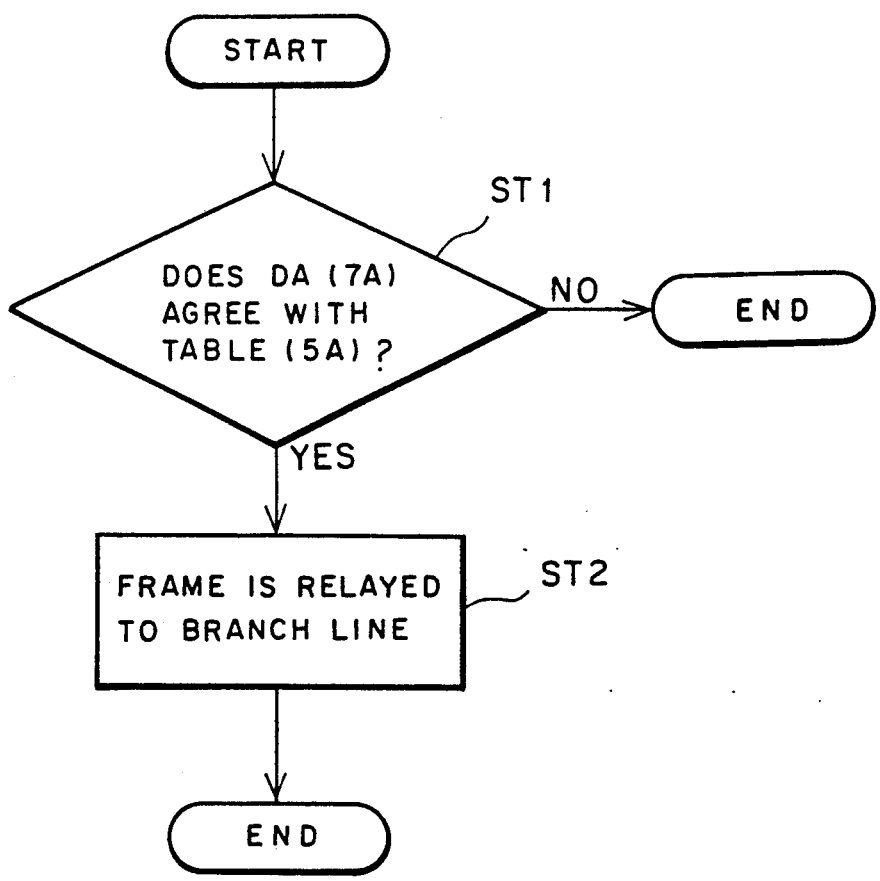
FIG. 10 is a flowchart showing the receiving operation for a frame from a trunk line LAN of the conventional apparatus.

Also, FIG. 4 shows a frame format on each of branch line LANs 21 to 23. Reference numeral 7C is a destination terminal address on each of the branch line LANs 21 to 23, 7D a source terminal address, and 7E data which a frame carries, all of which are same as those shown in FIG. 9.

Next, the operation will be described with reference to the flowcharts of FIG. 5 and FIG. 6.

Figure 5:
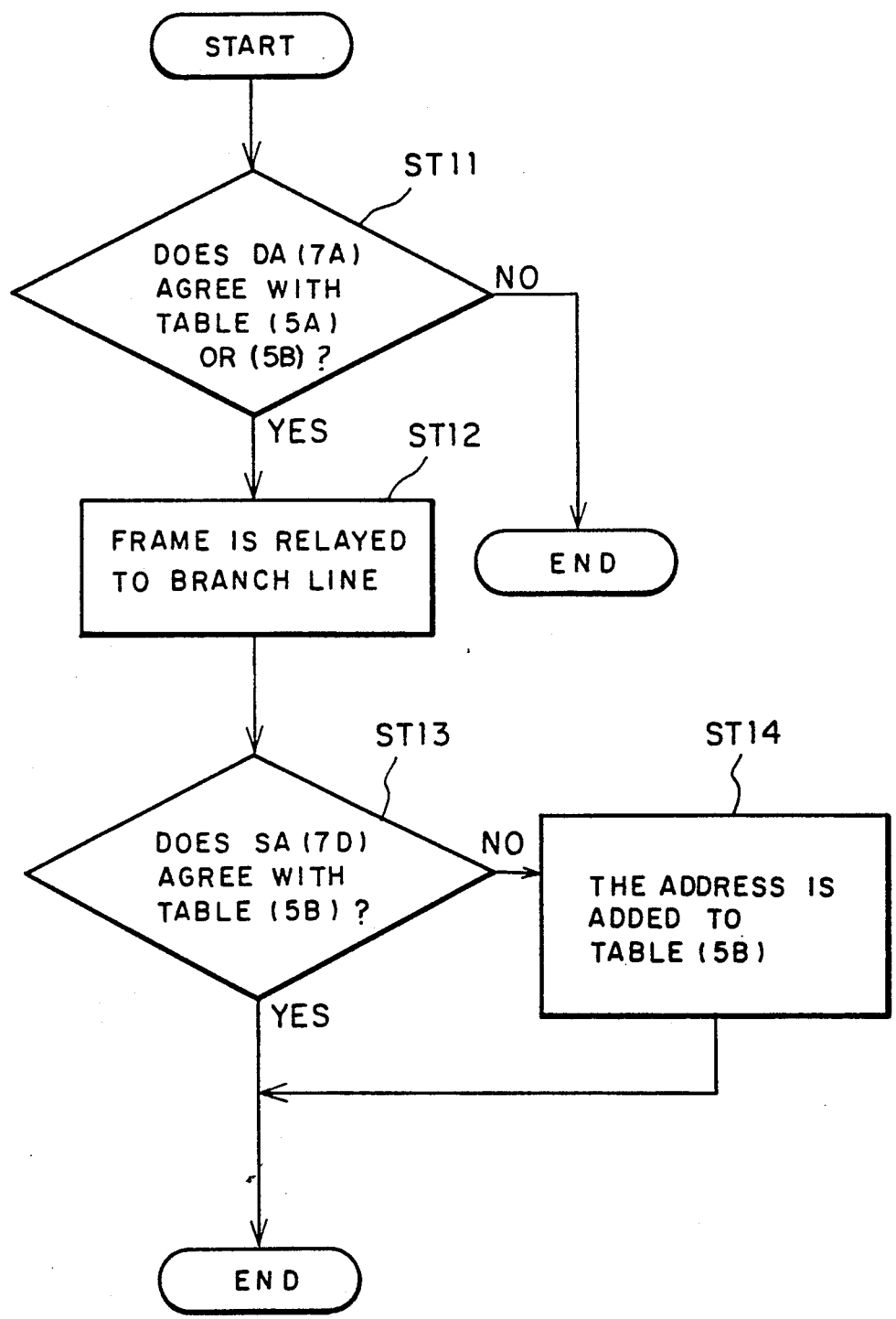
FIG. 5 is a flowchart showing the receiving operation for a frame from the trunk line LAN.
Figure 7:
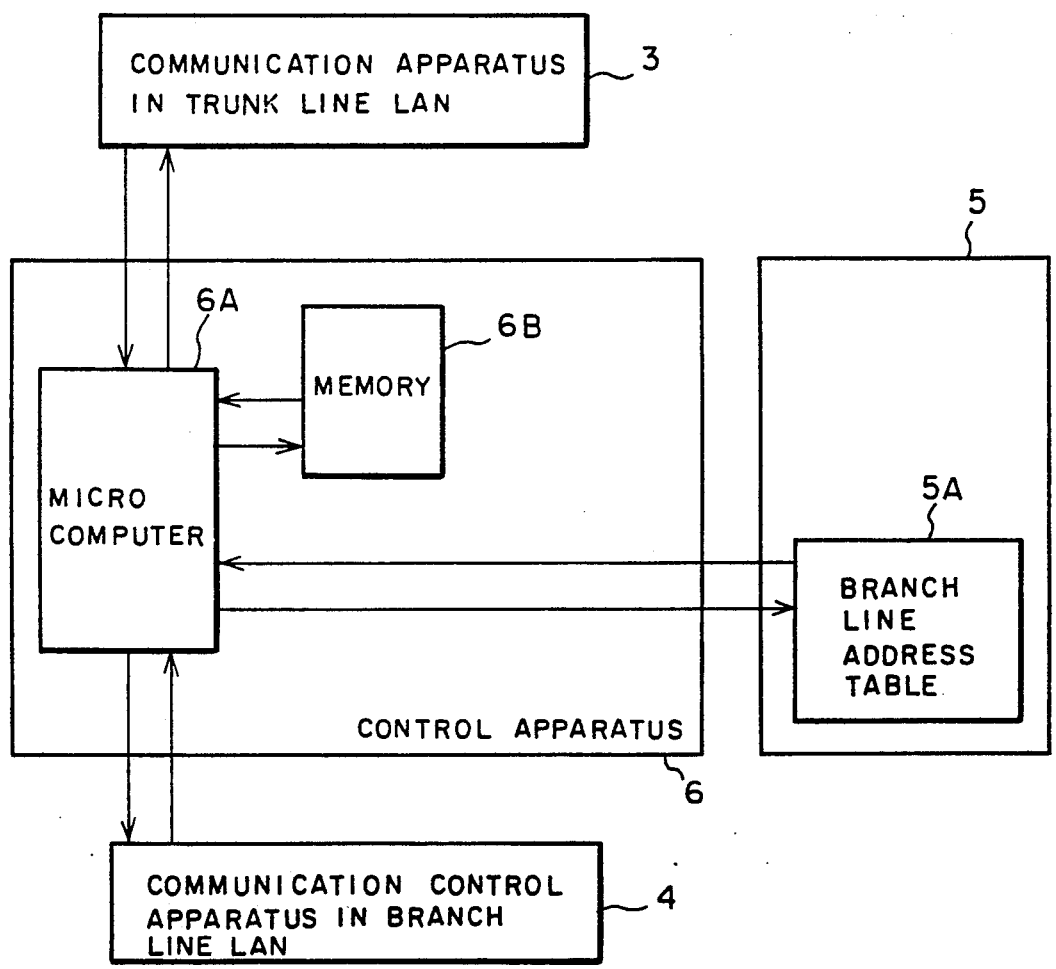
FIG. 7 is a block diagram showing a conventional bridge apparatus.

At first, FIG. 5 shows the receiving operation for a frame from the trunk line side to the control apparatus. When the reception of the frame from the trunk line LAN 1 is begun, it is judged whether the destination address 7A of the frame belongs to terminals a to f which exist in the network. (Step ST 11). If the destination address 7A agrees with the branch line address tables 5A, the frame is relayed to the corresponding branch line LAN (Step ST 12), and received by the above-mentioned destination terminal on the branch line LAN. Next, it is judged whether the source address 7D of the received frame agrees with the external address table 5B (Step ST 13). When the address do not agree with each other, the address is added to the external address table 5B (Step ST 14).

Figure 6:
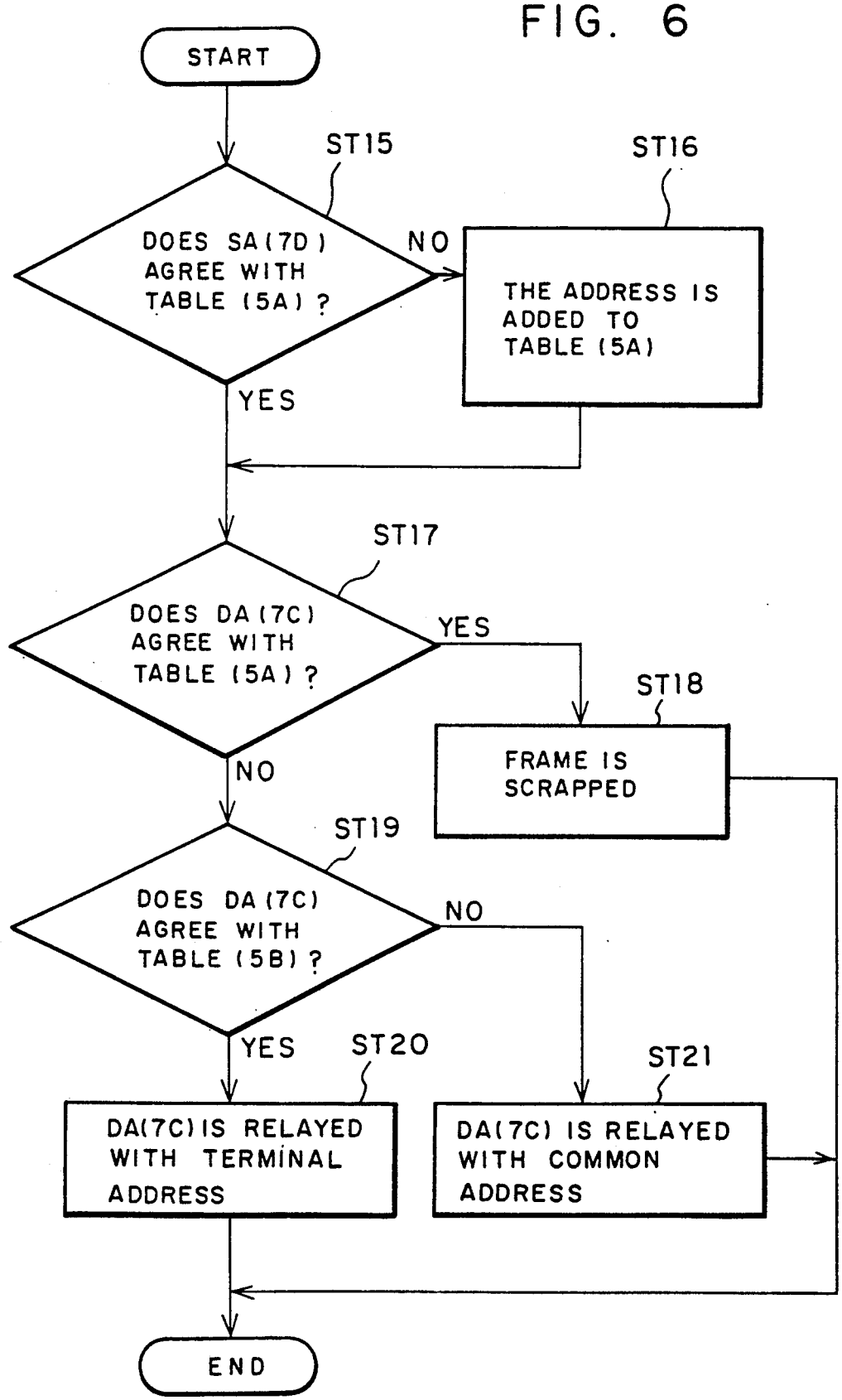
FIG. 6 is a flowchart showing the receiving operation for a frame from the branch line LAN.

FIG. 6 represents the receiving operation for a frame from the branch line LANs 21 to 23 to the control apparatus. According to the receiving operation, when the operation is begun by reception of the frame, at first it is checked whether the source address SA 7D of the frame exists, in the address table 5A (Step ST 15). If the addresses do not agree with each other, the address is added to the branch line address table 5A anew (Step ST 16). Next, it is checked whether the destination address DA7C of the frame exists in the branch address table 5A (Step ST 17). If the addresses agree with each other, it indicates that the frame is one between terminals on the same branch line LAN, and the frame is scrapped (Step ST 18). On the other hand, if the addresses do not agree with each other, it is judged that the frame is for terminals on the external branch line LANs, and the frame is relayed on the trunk line LAN in the following steps. In other words, the following steps are characteristic of the bridge apparatus. It is judged whether the destination address DA7C of the frame which performs relaying agrees with the external address table 5B (Step ST 19). When the addresses agree with each other, the transmission is carried out in the frame format shown in FIG. 3 (Step ST 20). At this time, the destination address DA7A used on the trunk line LAN 1 is equal to the destination address DA7C on the branch line. Next, when the destination address DA7C does not agree with the external address table 5B, it is considered that the address is not registered in the external bridge. In this case, a common address of the bridge apparatus is employed in place of the destination address 7A, and the common address is transmitted on the trunk line LAN 1 in the format shown in FIG. 3 (Step ST 21). The common address of the bridge apparatus is an address called (Z) which has been provided to branch line address tables 5A1 to 5A3 of each bridge apparatus in FIG. 2. This address (Z) is provided to all bridge apparatus as an initial value. All frames relayed on the trunk line LAN 1 using the address (Z) are received by all bridge apparatus and accordingly, all frames are relayed on all branch line LANs 21 to 23.

Incidentally, in this embodiment, though the common address of the bridge apparatus is employed as the destination address in the case where the address is not registered in the bridge apparatus, it is also possible to employ a broadcast address in place of the common address of the bridge apparatus.

The control apparatus may also periodically check, for each address stored in each of the address tables, the amount of time elapsed from the last time that that address appeared in a received data frame, and removes from the address tables those addresses for which the elapsed time exceeds a predetermined value. In this way, the contents of the address tables may limited, and terminals which have been moved from one branch line LAN to another may have their addresses placed in the proper address tables.

Also, the format of the frame employed may be one having a header for control and the like besides the format shown in the diagram.

Further, though this embodiment has been shown on the assumption that relay control, judgment of agreement of addresses, and address learning are implemented by the microcomputer 6A, even if it is implemented by a hard-wired logic circuit, the same effect can be obtained.

As described above, according to this invention, since the bridge apparatus is constituted in such a manner that it is judged whether the destination address of the frame relayed to the trunk line LAN is registered in other bridge apparatus, and the frame is relayed with a proper destination address based on the result of the judgment, even in the case where the address of the destination terminal is not registered in the bridge apparatus, the bridge apparatus is capable of carrying out communication securely.

What is claimed is:

1. A bridge apparatus interconnecting a branch line local area network (LAN) with a trunk line LAN, comprising:
    a branch line address table which stores addresses of terminals on said branch line LAN which have previously transmitted data to other terminals, wherein said data includes the address of the source terminal and the address of a destination terminal;
    an external address table which stores addresses of terminals on other branch line LANs connected to said trunk line LAN which have been stored in branch line address tables of said other branch line LANs;
    control apparatus for receiving data from said branch line LAN and said trunk line LAN, judging whether address information included in said received data agrees with the addresses stored in said branch line address table and said external address table, and controlling relaying of said received data between said branch line LAN and said trunk line LAN and updating the contents of said branch line and external address tables based on the results of the judgment.

2. The bridge apparatus according to claim 1, wherein the control apparatus compares a source address of a data frame received from the trunk line LAN with contents of an external address table and a source address of a frame received from the branch line LAN with contents of the branch line address table, respectively, and updates the respective address tables by adding the source addresses which do not agree with each other to the respective address tables.

3. The bridge apparatus according to claim 1, wherein said control apparatus periodically checks, for each address stored in each of the address tables, the amount of time elapsed from the last appearance of that address in a received data frame, and removes addresses from said address tables for which said amount of time exceeds a fixed value, thereby limiting an amount of contents in each of the address tables concerned, and allowing terminals which have been moved to other branch line LANs to have their addresses placed in the proper address tables.

4. The bridge apparatus according to claim 1, wherein the address table comprises a branch line address table for storing terminal addresses on the branch line LAN and an external address table for storing terminal addresses which have been already registered on other branch line LANs.

5. The bridge apparatus according to claim 1, wherein the entire data frame on the branch line LAN is stored in a data region of the data frame on the trunk line LAN.

* * * * *